(12) United States Patent
Hoots et al.

(10) Patent No.: US 8,663,058 B2
(45) Date of Patent: Mar. 4, 2014

(54) BRAKE ASSEMBLY HAVING PILOTED PARK BRAKE HOUSING

(75) Inventors: David C. Hoots, Forsyth, IL (US); Barry D. Bliss, Griffin, GA (US)

(73) Assignee: Caterpillar Inc., Peoria, IL (US)

( * ) Notice: Subject to any disclaimer, the term of this patent is extended or adjusted under 35 U.S.C. 154(b) by 207 days.

(21) Appl. No.: 13/356,120

(22) Filed: Jan. 23, 2012

(65) Prior Publication Data

US 2013/0190129 A1 Jul. 25, 2013

(51) Int. Cl.
*F16H 57/08* (2006.01)
*F16D 55/36* (2006.01)

(52) U.S. Cl.
USPC .................................. 475/331; 188/71.5

(58) Field of Classification Search
USPC .................. 475/116; 188/219.1, 233.3
See application file for complete search history.

(56) References Cited

U.S. PATENT DOCUMENTS

| | | | |
|---|---|---|---|
| 4,010,830 A | 3/1977 | Logus et al. |
| 4,024,936 A | 5/1977 | Crabb |
| 4,358,000 A | 11/1982 | Cumming |
| 4,396,100 A | 8/1983 | Eltze |
| 4,655,326 A | 4/1987 | Osenbaugh |
| 5,050,710 A | 9/1991 | Bargfrede |
| 5,495,927 A | 3/1996 | Samie et al. |
| 5,505,267 A | 4/1996 | Orbach et al. |
| 5,540,305 A | 7/1996 | Hammond et al. |
| 5,802,489 A | 9/1998 | Orbach et al. |
| 6,038,506 A | 3/2000 | Diekhaus et al. |
| 6,062,367 A | 5/2000 | Hirayanagi et al. |
| 6,174,255 B1 | 1/2001 | Porter et al. |
| 6,186,285 B1 | 2/2001 | Parsons |
| 6,237,727 B1 | 5/2001 | Tatewaki et al. |
| 6,264,009 B1 | 7/2001 | Johnson |
| 6,273,221 B1 | 8/2001 | Schmidt |
| 6,357,558 B1 | 3/2002 | Case et al. |
| 6,524,207 B2 | 2/2003 | Murakami et al. |
| 6,766,886 B2 | 7/2004 | Bendtsen et al. |
| 6,820,712 B2 | 11/2004 | Nakamura |

(Continued)

FOREIGN PATENT DOCUMENTS

| | | |
|---|---|---|
| EP | 1500839 A2 | 1/2005 |
| JP | 2001-056036 A | 2/2001 |
| JP | 2011021405 | 2/2011 |
| KR | 1999-0025463 U | 7/1999 |

OTHER PUBLICATIONS

U.S. Appl. No. 12/950,807 by Norval P. Thomson filed Nov. 19, 2010 entitled "Motor Grader Wheel Slip Control for Cut to Grade".

(Continued)

*Primary Examiner* — Edwin A Young
(74) *Attorney, Agent, or Firm* — Finnegan, Henderson, Farabow, Garrett & Dunner LLP

(57) ABSTRACT

A brake assembly for a mobile machine is disclosed. The brake assembly may have a stationary spindle, and a main brake housing annularly connected at a first axial end to the stationary spindle and at least partially forming a first control chamber. The brake assembly may also have a park brake housing annularly connected to a second axial end of the main brake housing and at least partially forming a second control chamber, and at least one piloting feature disposed between an inner annular surface of the park brake housing and an outer annular surface of the stationary spindle.

20 Claims, 4 Drawing Sheets

(56) References Cited

U.S. PATENT DOCUMENTS

| | | | |
|---|---|---|---|
| 7,014,027 B2 | 3/2006 | Adair et al. | |
| 7,258,208 B1 | 8/2007 | Dennis et al. | |
| 7,291,094 B2 | 11/2007 | Heier et al. | |
| 7,506,730 B2 | 3/2009 | Strandberg et al. | |
| 7,650,961 B2 | 1/2010 | Smith et al. | |
| 7,693,639 B2 | 4/2010 | Suzuki et al. | |
| 7,770,681 B2 | 8/2010 | Marathe et al. | |
| 7,980,364 B2 | 7/2011 | Ueno | |
| 7,980,375 B2 | 7/2011 | Suzuki et al. | |
| 8,006,813 B2 | 8/2011 | James et al. | |
| 2002/0045510 A1* | 4/2002 | Damm et al. | 475/83 |
| 2004/0251091 A1* | 12/2004 | Archer | 188/71.5 |
| 2009/0101458 A1 | 4/2009 | Strandberg et al. | |
| 2012/0196715 A1* | 8/2012 | Turner et al. | 475/159 |
| 2013/0161148 A1* | 6/2013 | Schoon | 192/219.4 |

OTHER PUBLICATIONS

U.S. Appl. No. 12/972,866 to Dennis Wetterich et al. filed Dec. 20, 2010 entitled "Traction Slip Indicator".

U.S. Patent Application by Gerry O. McCann et al. entitled "Powertrain System Having Lockable Differential" filed on Jan. 23, 2012.

U.S. Patent Application by David C. Hoots et al. entitled "Wet Brake Assembly" filed on Jan. 23, 2012.

U.S. Patent Application entitled "Multi-Brake System Having Independent Control" filed on Jan. 23, 2012.

U.S. Patent Application by Christopher A. Monroe entitled "Separator Plate for Brake Assembly" filed on Jan. 23, 2012.

* cited by examiner

BRAKE ASSEMBLY HAVING PILOTED PARK BRAKE HOUSING

TECHNICAL FIELD

The present disclosure is directed to a brake assembly and, more particularly, to a brake assembly having a piloted park brake housing.

BACKGROUND

Machines, including wheel loaders, on and off-highway haul and vocational trucks, motor graders, and other types of heavy equipment generally include a mechanical transmission drivingly coupled to opposing traction devices by way of front and/or rear differentials and two substantially identical final drives (one located between each differential and an associated traction device). Each differential receives a power input from the transmission and produces two power outputs directed through the final drives to the traction devices. The final drives function to reduce a rotational speed of the differential output to a level appropriate to drive the associated traction devices and thereby propel the machine.

Each final drive generally includes a stationary housing, an axle rotatably disposed within the housing and driven by the differential, and a brake assembly connected between the housing and the axle. Typical brake assemblies include a plurality of friction plates connected to rotate with the axle, a plurality of separator plates disposed between adjacent friction plates and rotationally constrained at their periphery by the housing, and a piston driven by pressurized fluid to push the friction plates and separator plates together, thereby generating frictional torque between the plates that retards rotation of the axle. An exemplary brake assembly is described in U.S. Pat. No. 4,655,326 issued to Osenbaugh on Apr. 7, 1987.

A common brake assembly problem involves fluid leaking from seals within the assembly. In particular, many brake assemblies are mounted to and supported by the stationary housing at inboard ends of the brake assemblies. In these configurations, the brake assemblies can experience sagging at a mid-point between the ends and/or misalignment at the ends that causes seals within the assembly to leak. If left unchecked, this leaking can lead to system failure and environmental violations.

The brake assembly of the present disclosure is directed toward solving one or more of the problems set forth above and/or other problems of the prior art.

SUMMARY

One aspect of the present disclosure is directed to a brake assembly. The brake assembly may include a stationary spindle, and a main brake housing annularly connected at a first axial end to the stationary spindle and at least partially forming a first control chamber. The brake assembly may also include a park brake housing annularly connected to a second axial end of the main brake housing and at least partially forming a second control chamber, and at least one piloting feature disposed between an inner annular surface of the park brake housing and an outer annular surface of the stationary spindle.

Another aspect of the present disclosure is directed to a piloting component for a brake assembly. The piloting component may include an arcuate segment having an annular base portion configured to engage an inner annular surface of a park brake housing and an outer annular surface of a stationary spindle. The piloting component may also include a flange portion extending radially outward from the annular base portion and configured to engage an axial end surface of the park brake housing and an axial end surface of a seal retainer.

DETAILED DESCRIPTION

Figure 1:
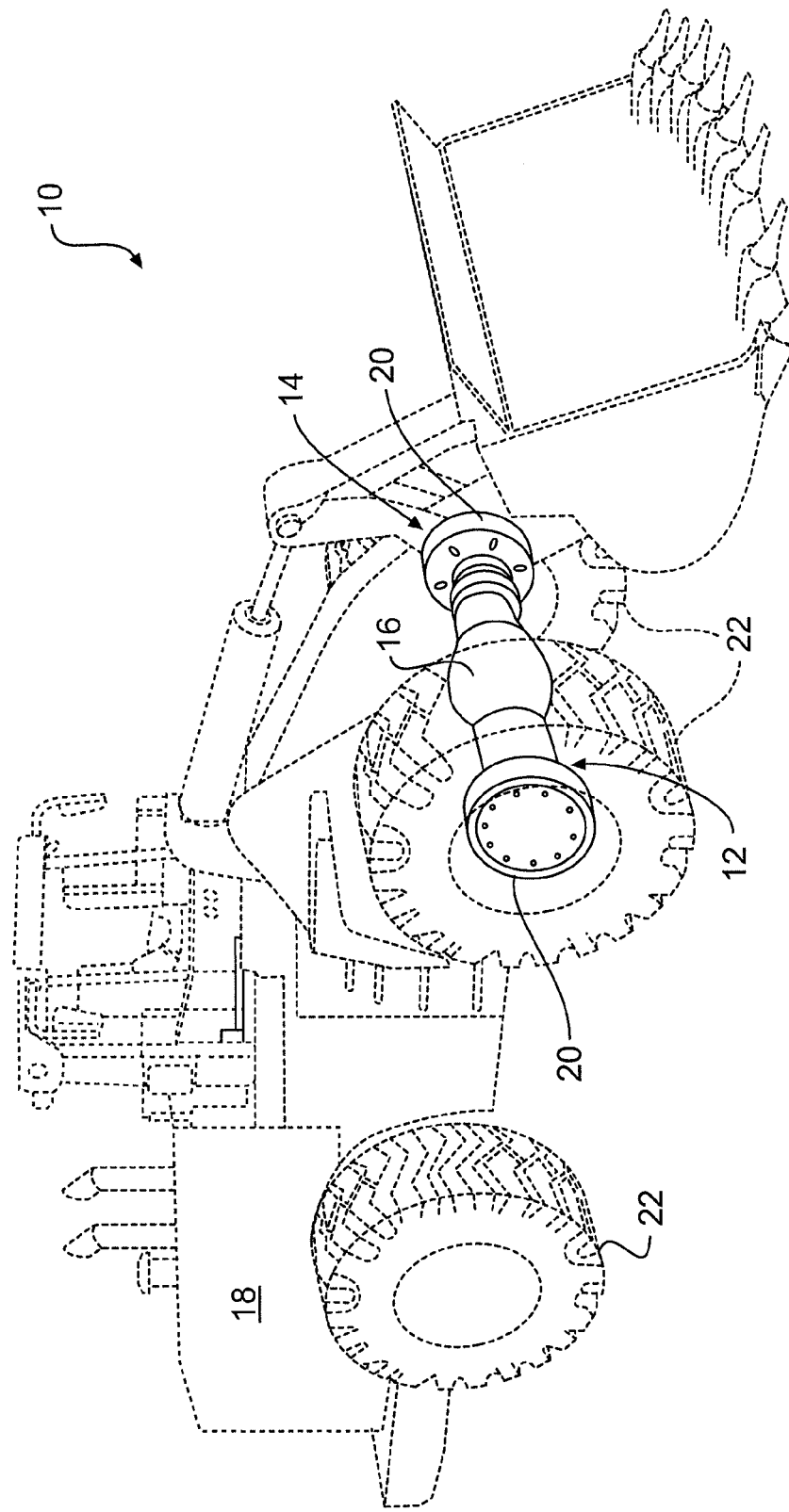
FIG. 1 is a pictorial illustration of an exemplary disclosed machine.

FIG. 1 illustrates an exemplary mobile machine 10 having right and left final drives 12, 14 coupled to each other by way of a differential 16. An input member, such as a driveshaft (not shown), may drivingly connect an engine 18 of machine 10 to differential 16, and an output member 20, such as a wheel, may drivingly connect final drives 12, 14 to traction devices 22 located on opposing sides of machine 10. In one embodiment, traction devices 22 may be tires, although other types of traction devices 22 may alternatively be utilized. Final drives 12, 14, may be drivingly coupled to differential 16 such that a rotation of the input member results in a corresponding rotation of traction devices 22.

Figure 2:
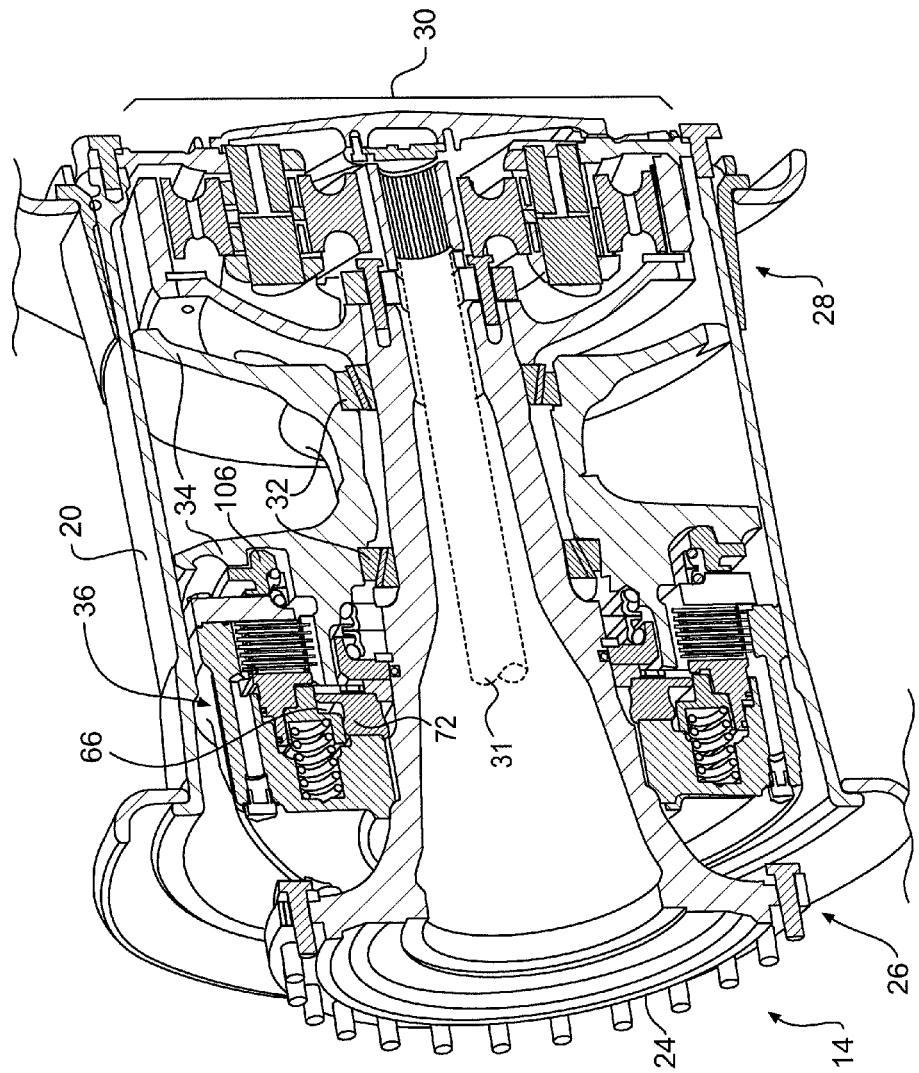
FIG. 2 is a cutaway illustration of an exemplary disclosed final drive that can be utilized in conjunction with the machine of FIG. 1.

Left final drive 14, as illustrated in FIG. 2, may include an internal housing 24 (e.g., a spindle) configured to engage a stationary body of machine 10 (e.g., a housing of differential 16) at a first end 26 and support at an opposing second end 28 a planetary gear arrangement 30. Planetary gear arrangement 30 may be driven by differential 16 via an axle 31 that passes from differential 16 (referring to FIG. 1) through a center of internal housing 24. One or more bearings 32 may be spaced apart along an outside of internal housing 24 to support rotation of output member 20 via a one or more radially-extending webs 34. In this arrangement, webs 34 and output member 20 may be integral or otherwise rigidly connected to rotate together about internal housing 24. Output member 20 may be driven by differential 16 via axle 31, and speed-reduced by planetary gear arrangement 30. Although not shown in detail in the figures, it should be noted that right final drive 12 may be substantially identical to left final drive 14.

Figure 3:
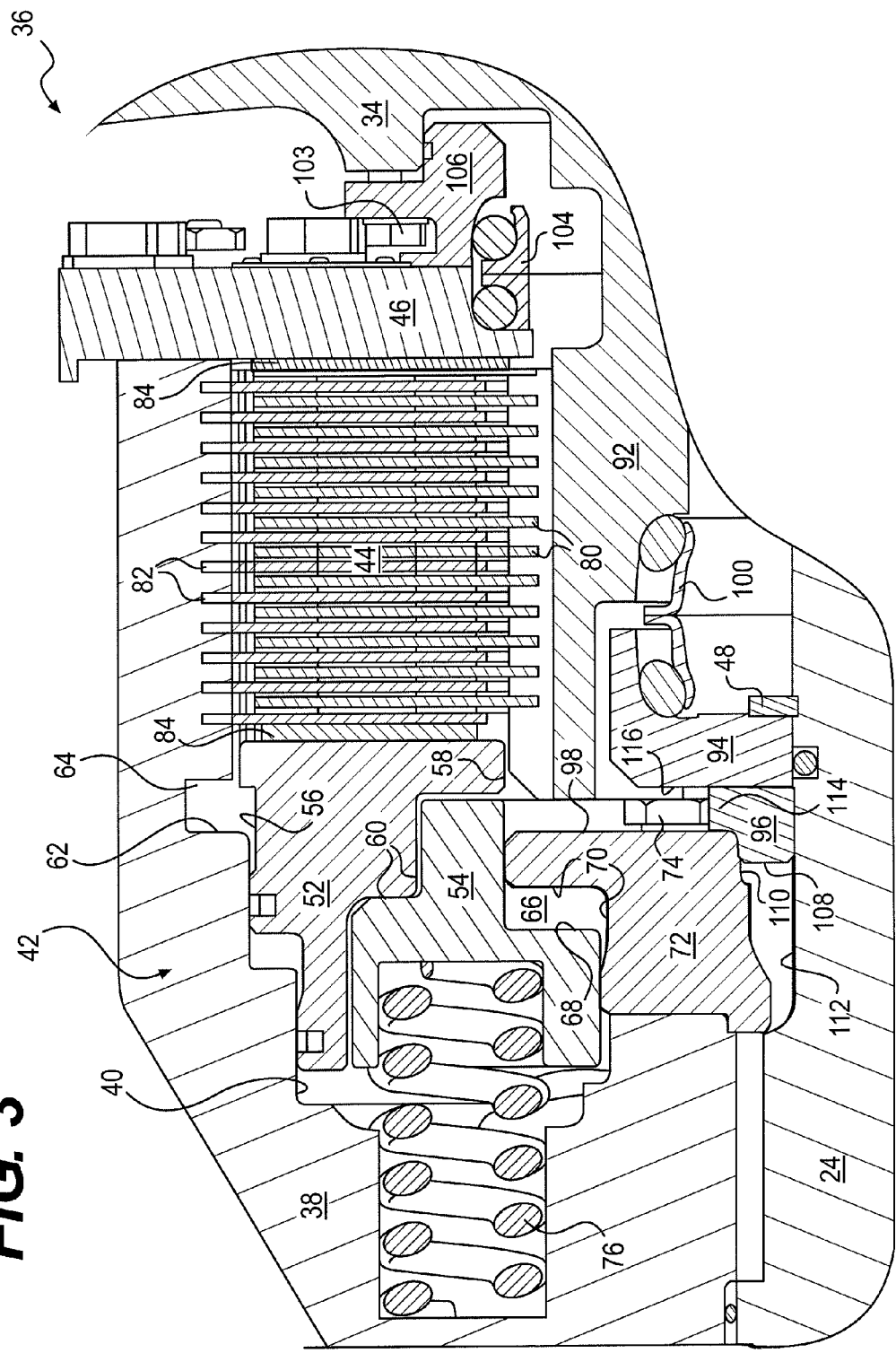
FIG. 3 is a cross-sectional illustration of a brake assembly associated with the final drive of FIG. 2.
Figure 4:
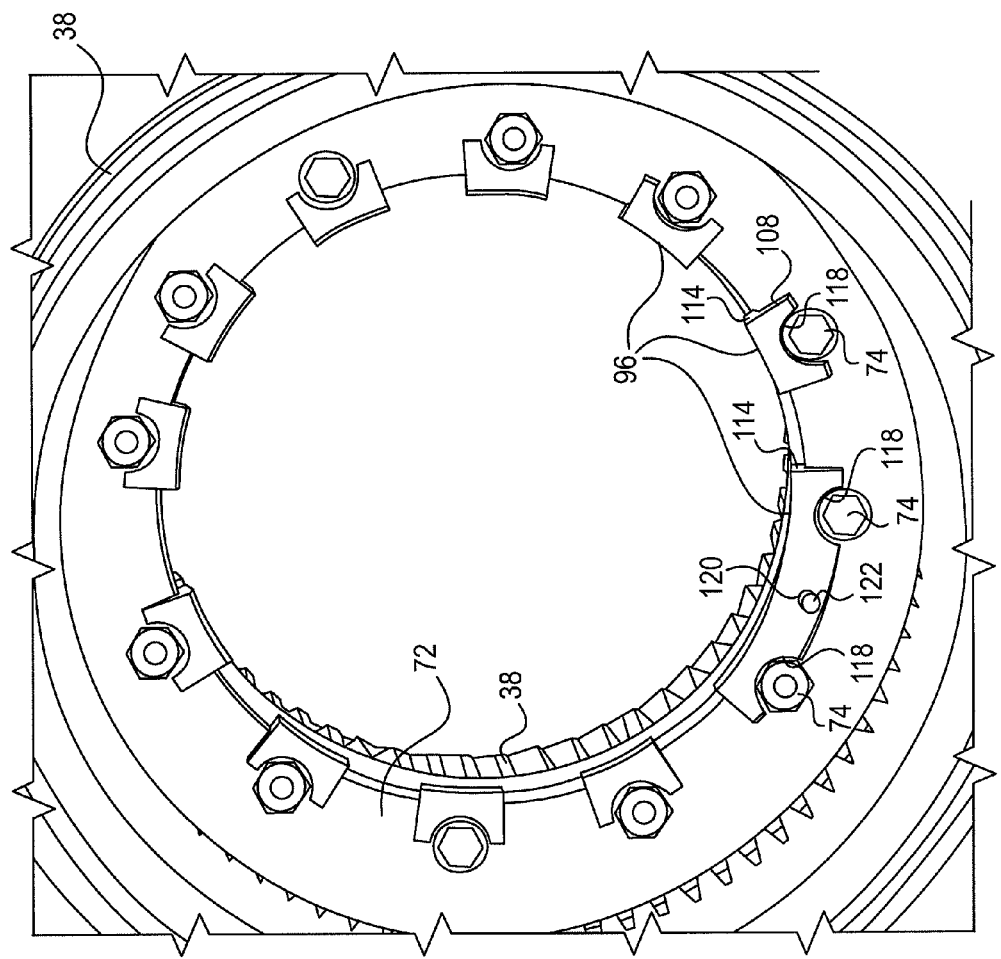
FIG. 4 is an isometric view illustration of a portion of the brake assembly of FIG. 3.

Right and left final drives 12, 14 may each be equipped with an internal brake assembly 36 configured to resist rotation of output member 20 relative to internal housing 24. Referring to FIGS. 3 and 4, brake assembly 36 may include, among other things, a stationary main brake housing 38 that, together with webs 34 of output member 20, at least partially forms an enclosed annular cavity or recess 40. Recess 40 may be configured to receive an actuator 42, a disc stack 44, and a reaction plate 46 located at an end of disc stack 44 opposite actuator 42 to close off an end of recess 40.

Main brake housing 38 may be a ring-like and generally hollow structure that is fixedly connected to an axial end of internal housing 24 opposite planetary gear arrangement 30 (referring to FIG. 2) by way of one or more fasteners (e.g., by way of a snap ring 48 and one or more shims that axially position main brake housing 38 relative to internal housing 24, as will be described in more detail below). In an exemplary embodiment, main brake housing 38 may be formed through a casting process. It is contemplated, however, that main brake housing 38 may alternatively be formed through a fabrication and/or machining process, if desired.

For the purposes of this disclosure, a machined surface may be considered a surface achieved through a material removal process to create desired geometry. Conventional machining processes include, without limitation, turning, boring, drilling, milling, broaching, sawing, shaping, planing, reaming, tapping, grinding, discharge machining, electrochemical machining, electron beam machining, photochemical machining, and ultrasonic machining. In contrast to a machined surface, a cast surface may be a surface created through a material addition process. For example, a cast surface may be created when a molten material is deposited within a mold and cooled to a solid state in a particular geometric design.

Actuator 42 may include a service piston 52 and a park piston 54 that work separately and together at different times to slow, stop, or hold machine 10 still under different conditions. Service piston 52 may be ring-like and have a generally L-shaped cross section defining an outer annular surface 56 (at the back of the L-shape), an inner annular surface 58 (at the tip end of the L-shape), and at least one internal shoulder 60 located between outer and inner annular surfaces 56, 58. Outer annular surface 56, together with an inner annular surface 62 of main brake housing 38, may form a first control chamber 64. When first control chamber 64 is filled with pressurized oil, service piston 52 may be urged toward reaction plate 46, thereby compressing disc stack 44. During operation of machine 10, the pressurized fluid may also be directed into a second control chamber 66 formed between end surface 68 of park piston 54 and outer annular surfaces 70 of a park brake housing 72. When second control chamber 66 is filled with pressurized oil, park piston 54 may be urged away from service piston 52.

In some embodiments, outer annular surface 56 may not form a continuous outer surface. That is, it may be possible to use outer annular surface 56 to pilot service piston 52 within main brake housing 38. In these embodiments, outer annular surface 56 may be formed by annular segments, for example three or more different segments, if desired.

Snap ring 48 may axially position main brake housing 38 relative to internal housing 24 via park brake housing 72. In particular, park brake housing 72 may be generally ring-like and fixedly connected by way of one or more fasteners 74 to an axial end of main brake housing 38 at a location opposite the engagement of main brake housing 38 with internal housing 24. A seal retainer 94 may be axially positioned adjacent snap ring 48, and at least one piloting component 96 may be axially located between seal retainer 94 and an axial end 98 of park brake housing 72. In this configuration, snap ring 48 may axially constrain movement of seal retainer 94, which may axially constrain movement of piloting component 96, which may axially constrain movement of park brake housing 72, which is fixedly connected to main brake housing 38. A seal 100 (e.g., a dual o-ring face seal) may be disposed at an axial interface between seal retainer 94 and a spline 92 associated with web 34 and output member 20.

Piloting component 96 may include geometry that functions as piloting features for use in radially positioning and supporting park brake housing 72. Specifically, as shown in FIGS. 3 and 4, piloting component 96 may be an arcuate segment having an annular base portion 108 configured to engage an inner annular surface 110 of a park brake housing 72 and an outer annular surface 112 of a stationary spindle, and a flange portion 114 extending radially outward from the annular base portion and configured to engage axial end 98 of park brake housing 72 and an axial end surface 116 of seal retainer 94. In this configuration, park brake housing 72 may be positioned at a desired radial distance from internal housing 24 and supported by internal housing 24 via base portion 108 of piloting component 96. Accordingly, annular base portion 108 may function as the piloting feature for park brake housing 72. Although the piloting feature is shown in the exemplary embodiment as part of a separate and stand-alone component, it is contemplated that the piloting feature (i.e., at least base portion 108) could alternatively be integrally formed with park brake housing 72 or seal retainer 94, if desired.

As shown in FIG. 4, a plurality of piloting components 96 may be utilized around an inner periphery of park brake housing 72 to position and support park brake housing 72. In the exemplary embodiment, 11 different piloting components 96 are included, although any number of piloting components 96 may be utilized, as desired. Each piloting component 96 may include at least one recess 118 located within base portion 108. Each recess 118 may be configured to configured to receive one of fasteners 74 that connect park brake housing 72 to main brake housing 38, thereby annularly locating piloting components 96 (i.e., preventing components 96 from annularly moving around the inner periphery of park brake housing 38 during operation). In the exemplary embodiment of FIG. 4, two different configurations of piloting components 96 are shown, including a first configuration having a single recess 118 associated with a single fastener 74 and a second longer configuration having multiple recesses 118 associated with multiple fasteners 74. It is contemplated that each piloting component 96 may have any length, have any number of recesses, and be associated with any number of fasteners 74, as desired.

In addition to or instead of recesses 118, some or all of piloting components 96 may be pinned to park brake housing 72. Specifically, each piloting component 96 may include a bore 120 passing through base portion 108, and a dowel 122 extending from axial end 98 of park brake housing 72 to engage bore 120. In this configuration, dowel 122 may help to reduce unwanted movements of piloting components 96 during operation of brake assembly 36. Additionally, dowel 122 may pass from park brake housing 38, through piloting components 96 to engage seal retainer 94 at an opposing side of piloting components 96 and thereby help reduce annular movement of seal retainer 96.

Referring back to FIG. 3, a plurality of springs 76 may be disposed between main brake housing 38 and park piston 54 to bias park piston 54 into engagement with service piston 52. When pressurized fluid is not supplied into second control chamber 66, for example when machine 10 is turned off, park piston 54 may be biased into engagement with service piston 52 to compress disc stack 44, thereby providing braking of traction devices 22 when machine 10 is parked.

Disc stack 44 may include a plurality of friction plates 80, a plurality of separator plates 82 interleaved with friction plates 80, and a damper 84 located at each end of disc stack 44. Friction plates 80 may be connected to rotate with output member 20 (via web 34), while separator plates 82 may be connected to stationary main brake housing 38. In this manner, when actuator 42 is activated, friction plates 80 may be sandwiched between actuator 42, separator plates 82, and reaction plate 46, thereby creating frictional torque that resists rotation of output member 20. A pressure of fluid within actuator 42 (i.e., within first control chamber 64) may relate to a magnitude of the frictional torque resisting rotation of output member 20.

Each friction plate 80 may include a generally plate-like ring having a plurality of inwardly extending protrusions (e.g., gear teeth) that are configured to engage corresponding outwardly extending geometry (e.g., gear teeth of a spline 92) such that friction plates 80 rotate together with output member 20. Each friction plate 80 may be fabricated as a single integral component from metal, for example from steel, and be provided with a bonded friction material, a coating, and/or a roughened texture (e.g., intersecting grooves) at axial surfaces thereof to increase a coefficient of friction of friction plates 80. Brake assembly 36 illustrated in FIG. 3 includes 11 substantially identical friction plates 80 spaced from each other by separator plates 82, although the number of friction plates 80 should correspond with frictional requirements of machine 10.

Separator plates 82, like friction plates 80, may also include a generally plate-like ring having a plurality of outwardly extending protrusions (e.g., gear teeth) that are configured to engage corresponding inwardly extending geometry (e.g., gear teeth of main brake housing 38) such that separator plates 82 are held stationary by brake housing 38. Each separator plate 82 may be fabricated as a single integral component, for example from wrought steel. Brake assembly 36 illustrated in FIG. 3 includes 12 substantially identical separator plates 82, although any number of separator plates 82 may be utilized.

Reaction plate 46 may be a stationary member that is operatively coupled to internal housing 24 via main brake housing 38. In some embodiments, reaction plate 46 may be considered to form a portion of main brake housing 38, and close off recess 40 that contains the remaining components of brake assembly 36. In this configuration, reaction plate 46 may function as an end-stop for service and park pistons 52, 54 such that, when service and/or park pistons 52, 54 are pushed against disc stack 44 by pressurized fluid, reaction plate 46 may create an opposing force that effectively sandwiches friction and separator plates 480, 82 therebetween. A seal 104 (e.g., a dual o-ring face seal) and seal retainer 106 may be disposed between reaction plate 46 and an axial end of web 34 to seal a sliding interface between the rotating and stationary components of brake assembly 36. Seal retainer 106 may be fixedly joined to web 34 by, for example, one or more fasteners 103.

Damper 84 may be generally ring-like and fabricated from a dampening material such as a polymer (e.g., rubber) or cork that is bonded or otherwise fastened to a more rigid backing (not shown). In some embodiments, damper 84 may be bonded to an end-located separator plate 82. Damper 84 may be configured to dampen vibrations within brake assembly 36.

Industrial Applicability

The disclosed brake assembly may be applicable to any final drive where longevity of the drive is desired. The disclosed brake assembly may provide for longevity of the final drive through novel geometry that helps reduce a likelihood of seals within the final drive leaking or failing completely.

It has been determined that cyclical operation of a brake assembly (i.e., applying and releasing of piston force to disc stack 44) can cause seals associated with the assembly to leak. In particular, each time a piston force is applied to disc stack 44 to activate the brake assembly, components of the brake assembly tend to shift radially relative to the associated internal housing. And each time the piston force is subsequently released after activation, the components tend to sag radially back to the position previously held when the piston force was previously relieved. This cyclical operation can result in seals within the assembly wearing prematurely or moving, resulting in leakage. Seal leaking can also be caused by misalignment of brake assembly components relative to the internal housing.

The cycles of shifting and sagging of the brake assembly can be reduced in magnitude and/or frequency, if the brake assembly can be radially supported (i.e., piloted) near or at its axial midpoint. In the disclosed brake assembly, base portion 108 of piloting component 96 may provide this functionality.

It will be apparent to those skilled in the art that various modifications and variations can be made to the brake assembly of the present disclosure without departing from the scope of the disclosure. Other embodiments will be apparent to those skilled in the art from consideration of the specification and practice of the brake assembly disclosed herein. It is intended that the specification and examples be considered as exemplary only, with a true scope of the disclosure being indicated by the following claims and their equivalents.

What is claimed is:

1. A brake assembly, comprising:
   a stationary spindle;
   a main brake housing annularly connected at a first axial end to the stationary spindle and at least partially forming a first control chamber;
   a park brake housing annularly connected to a second axial end of the main brake housing and at least partially forming a second control chamber; and
   at least one piloting feature disposed between an inner annular surface of the park brake housing and an outer annular surface of the stationary spindle.

2. The brake assembly of claim 1, further including a seal retainer positioned against an axial end of the park brake housing opposite the main brake housing, wherein the at least one piloting feature is an integral portion of the seal retainer.

3. The brake assembly of claim 1, wherein the at least one piloting feature is an integral portion of the park brake housing.

4. The brake assembly of claim 1, wherein the at least one piloting feature includes a plurality of separate piloting features annularly disposed around an inner periphery of the park brake housing.

5. The brake assembly of claim 1, further including at least one fastener configured to connect the park brake housing to the main brake housing, wherein the at least one piloting feature includes at least one positioning recess configured to receive the at least one fastener and annularly position the at least one piloting feature.

6. The brake assembly of claim 5, wherein:
   the at least one fastener includes a plurality of fasteners; and
   the at least one positioning recess includes a plurality of positioning recesses configured to receive the plurality of fasteners and annularly position the at least one piloting feature.

7. The brake assembly of claim 5, further including at least one dowel configured to pin the at least one piloting feature to the park brake housing at a first side of the at least one piloting feature and to a seal retainer on an opposing side of the at least one piloting feature.

8. The brake assembly of claim 1, wherein the at least one piloting feature has an L-shaped cross-section configured to engage the inner annular surface and an axial end surface of the park brake housing.

9. The brake assembly of claim 1, further including:
   a seal retainer positioned at an axial end of the park brake housing opposite the main brake housing; and
   a snap ring configured to engage the stationary spindle and axially constrain the seal retainer, wherein the at least one piloting feature is part of a component disposed axially between the park brake housing and the seal retainer to position the park brake housing.

10. The brake assembly of claim 9, further including:
an output member rotatably mounted to the stationary spindle in general axial alignment with the seal retainer; and
a first seal disposed at an axial interface between the output member and the seal retainer.

11. The brake assembly of claim 10, wherein the first seal is disposed at an axial interface between a spline of the output member and the seal retainer.

12. The brake assembly of claim 11, further including:
a disc stack disposed within a cavity at least partially formed by the main brake housing and the output member, the disc stack being operatively connected to the main brake housing and the spline of the output member; and
a service piston disposed within the cavity and movable by pressurized fluid within the first control chamber to compress the disc stack.

13. The brake assembly of claim 12, further including a park piston disposed within the cavity, spring biased toward the service piston, and movable away from the service piston by pressurized fluid within the second control chamber.

14. The brake assembly of claim 13, further including:
a reaction plate configured to engage the main brake housing and close off the cavity; and
a second seal disposed at an axial interface of the reaction plate and the output member.

15. A piloting component for a brake assembly, comprising:
an arcuate segment having an annular base portion configured to engage an inner annular surface of a park brake housing and an outer annular surface of a stationary spindle; and
a flange portion extending radially outward from the annular base portion and configured to engage an axial end surface of the park brake housing and an axial end surface of a seal retainer.

16. The piloting component of claim 15, wherein the annular base portion and the flange portion form a generally L-shaped cross-section.

17. The piloting component of claim 16, further including at least one recess located within the radially extending flange portion and configured to engage at least one fastener in the park brake housing to annularly position the piloting component.

18. The piloting component of claim 17, wherein:
the at least one fastener includes a plurality of fasteners; and
the at least one recess includes a plurality of recesses configured to receive the plurality of fasteners and annularly position the at least one piloting component.

19. The piloting component of claim 15, further including a bore passing through the flange portion and configured to receive a dowel to pin the piloting component to the brake housing.

20. A final drive, comprising:
a stationary spindle;
a planetary gear arrangement disposed at one end of the stationary spindle;
an axle passing through the stationary spindle to engage the planetary gear arrangement;
a wheel rotatably mounted around the stationary spindle and driven by the planetary gear arrangement;
a main brake housing connected to an end of the stationary spindle opposite the planetary gear arrangement and at least partially forming a first control chamber;
disc stack disposed within a cavity at least partially formed by the main brake housing and the wheel, the disc stack being operatively connected to the main brake housing and a spline of the wheel;
a service piston disposed within the cavity and movable by pressurized fluid within the first control chamber to compress the disc stack;
a park brake housing annularly connected to the main brake housing and at least partially forming a second control chamber;
a park piston disposed within the cavity, spring biased toward the service piston, and movable away from the service piston by pressurized fluid within the second control chamber;
a seal retainer positioned at an axial end of the park brake housing opposite the main brake housing;
a snap ring configured to engage the stationary spindle and axially constrain the seal retainer;
a first seal disposed at an axial interface between the spline of the wheel and the seal retainer; and
at least one piloting component disposed between an inner annular surface of the park brake housing and an outer annular surface of the stationary spindle and axially between the park brake housing and the seal retainer.

* * * * *

UNITED STATES PATENT AND TRADEMARK OFFICE
CERTIFICATE OF CORRECTION

| | |
|---|---|
| PATENT NO. | : 8,663,058 B2 |
| APPLICATION NO. | : 13/356120 |
| DATED | : March 4, 2014 |
| INVENTOR(S) | : Hoots et al. |

It is certified that error appears in the above-identified patent and that said Letters Patent is hereby corrected as shown below:

In the Specification

Column 5, line 51, delete "Industrial Applicability" and insert -- INDUSTRIAL APPLICABILITY --.

Signed and Sealed this
Fifteenth Day of September, 2015

Michelle K. Lee
*Director of the United States Patent and Trademark Office*